(12) United States Patent
Hirano et al.

(10) Patent No.: US 8,847,905 B2
(45) Date of Patent: Sep. 30, 2014

(54) MULTI-TEXTURE FOR FIVE BUTTON CLICK PAD TOP SURFACE

(75) Inventors: Hiroki Hirano, Kanagawa-ken (JP); Aaron Michael Stewart, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 208 days.

(21) Appl. No.: 13/572,917

(22) Filed: Aug. 13, 2012

(65) Prior Publication Data

US 2014/0043249 A1   Feb. 13, 2014

(51) Int. Cl.
*G06F 3/041* (2006.01)
*G09G 5/00* (2006.01)

(52) U.S. Cl.
USPC .......................................... 345/173; 345/212

(58) Field of Classification Search
CPC ........... G06F 1/00; G06F 3/002; G06F 3/041; G06F 3/045; G06F 3/03547; B44C 1/22
See application file for complete search history.

(56) References Cited

U.S. PATENT DOCUMENTS

2010/0079404 A1*   4/2010   Degner et al. ................. 345/174

FOREIGN PATENT DOCUMENTS

WO    WO2010/138288    2/2010

OTHER PUBLICATIONS

Synaptics, Inc., "ClickPad", http//www.synaptics.com/solutions/products/clickpad, 2004-2011, pp. 1-3.

* cited by examiner

*Primary Examiner* — Michael Faragalla
(74) *Attorney, Agent, or Firm* — Shimokaji & Associates P.C.

(57) ABSTRACT

An input device and computing system is provided for a user to input data. An input device may comprise a touch sensitive surface. The touch sensitive surface may have at least one part comprising a topological feature. The topological feature at one part may differ from topological features in other parts of the touch sensitive surface.

12 Claims, 1 Drawing Sheet

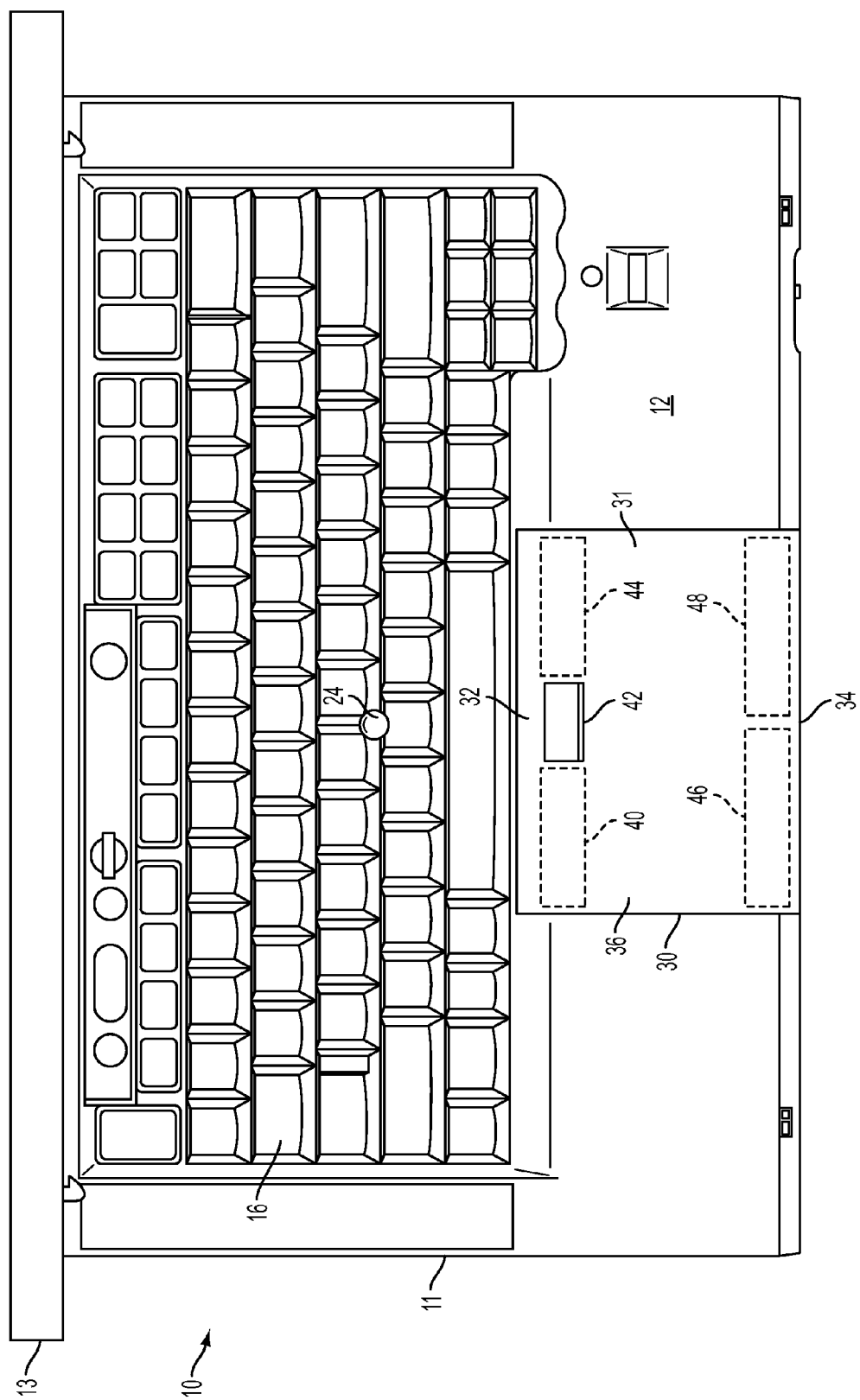

MULTI-TEXTURE FOR FIVE BUTTON CLICK PAD TOP SURFACE

BACKGROUND OF THE INVENTION

The present invention relates generally to methods and apparatus for data input and, more specifically, to methods and apparatus for data input to computers and other electronic instruments.

Pointing devices are common touch sensitive input devices for computers, laptops, cell phones, PDAs (personal digital assistants), and other electronic devices. Users may employ a pointing device, such as a mouse, trackball, track point, touchpad, or touch screen, to move a cursor on the screen to make selections.

Nestled between the "G", "H", and "B" keys on many laptop computers is a pointing stick. The pointing stick, often referred to as "the little red button", may be used for moving a mouse pointer with an index finger. A TrackPoint® device consists of the pointing stick and three buttons, which are situated at the center, below the space bar, and may be pushed with a thumb. The left button and right button may correspond to a left and right mouse button. When a user moves the pointing stick while pushing the center button below the space bar, a scroll function may be activated.

A typical touchpad consists of one touch sensor and two buttons that are situated below the touch sensor. Touchpads offer a promise of having a spatial correspondence to the surface of the computer screen, so as the finger moves around the touchpad, the cursor or pointer on the screen moves correspondingly to a new position.

In recent years, "click touchpad" or "click pad" technology has been developed which allows touchpads, touch screens, and other touch sensors to provide tactile feedback by being at least partially depressable or "clickable." The "click" may be purely tactile feedback or may be used to generate a signal that is used by the electronic system in which the click pad is installed.

Therefore, it can be seen that there is a continuing need for improvements in input devices, including those using click pad technology. In particular, there is a need for a better user experience with a simple looking and economical input device.

SUMMARY

In one aspect, an input device comprises a touchpad having a touch sensitive surface, wherein the touch sensitive surface has at least one part comprising a topological feature, wherein the topological feature differs from topological features in other parts of the touch sensitive surface, wherein the touch sensitive surface has at least a continuous surface with demarcated parts representing zones; and a switch disposed under the touchpad.

In another aspect, an input device comprises a touchpad having a touch sensitive surface, wherein the touchpad is delineated into zones, wherein the zones include a button zone which comprises a center button, a left button zone, and a right button zone; and the touch sensitive surface is made of a dielectric material, wherein the touch sensitive surface is responsive to clicking by an object.

In a further aspect, a computing system comprises a computing device capable of receiving, processing, and outputting data; an input device adapted to send data to the computing device in order to perform an action in the computing device, wherein the input device comprises: a touchpad coupled to the computing device by a switch and configured to generate touching signals; and the touchpad includes an uninterrupted glass surface, wherein the surface has at least one part comprising a topological feature differing from topological features in other parts of the surface.

These and other features, aspects and advantages of the present invention will become better understood with reference to the following drawings, description and claims.

BRIEF DESCRIPTION OF THE DRAWINGS

The FIGURE is a top view of a notebook PC according to an exemplary embodiment in use.

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments may comprise an input device, such as a touchpad, for example, which may be used for various models or designs of electronic devices, such as a notebook PC, a smart phone, a cell phone, and a personal digital assistant, for example. More specifically, exemplary embodiments provide alternatives to an existing click pad by using glass for the surface of the click pad.

Exemplary embodiments optimize the user-friendliness of communications devices from a tactile input perspective. Additional input points and options enable complex applications of functions otherwise impractical for computing devices. In exemplary embodiments, the glass surface with different surface texture in one part and another surface texture for another part of the surface may be used to indicate a specific area which is allocated for a functional button.

Exemplary embodiments may further include a switch disposed under the touchpad. Through contact of an object, such as a user's finger, on the touchpad, the switch under the touchpad may be pressed to make contact with a touch pad. When the object moves away from the touchpad, a support may bias the touchpad back to the flat position. The touch sensitive surface may have at least one part comprising a topological feature, wherein the topological feature differs from topological features in other parts of the touch sensitive surface. The touch sensitive surface may have at least a continuous surface with demarcated parts representing zones. One end of the touchpad may be delineated into TrackPoint® button zones. Another end of the touchpad may be delineated into touchpad button zones. TrackPoint® button zones may have a left button zone, a center button zone, and a right button zone, for example. The center button zone may have a glossy surface, for example. The left and the right button zones may have matt area.

The FIGURE is a top view of an exemplary embodiment of a computing system which is capable of receiving, processing, and outputting data, such as a notebook PC 10. The notebook PC 10 may be a laptop computer system, such as one of the ThinkPad® series of personal computers sold by Lenovo (US) Inc. of Morrisville, N.C., or a workstation computer, such as the ThinkStation®, which is sold by Lenovo (US) Inc. of Morrisville, N.C. The notebook PC 10 may have a display casing 13. A bottom case 11 may further accommodate system devices, such as a printed circuit board (PCB)

(not shown). A keyboard unit 16 may be adapted for installation in the notebook PC 10. The bottom case 11 and the display casing 13 may be openably coupled to each other via hinge portions (not shown).

Still referring to the FIGURE, the keyboard unit 16 may be electrically connected to the printed circuit board. The keyboard unit 16 may further include a pointing stick 24, which is used for moving a mouse pointer with an object, such as an index finger. The notebook PC 10 may further include an input device 12 adapted to send data to the notebook PC 10 in order to perform an action in the notebook PC 10. The input device 12 may be a flat touchpad 30, for example.

Still in the FIGURE, a touchpad 30 may have a top cover 36. The top cover 36 may have a touch sensor 31, which may be a sensor to detect touch or contact to the touchpad 30. When an object on the touching surface of the touchpad 30 is moved, the touchpad may generate a touching signal. The touch sensitive surface may be responsive to clicking by an object. In one exemplary embodiment, the touch sensor 31 may be a single capacitive sensor (rather than multiple traces or cells per key). The touchpad 30 may be, for example, any type of touchpad, which are generally well known (e.g., capacitive, resistive, or electromagnetic touchpads). For example, touchpad 30 may be a capacitive touchpad, which may include typically a two-dimensional grid of intersecting conductive traces (not shown) in different directions, for example, horizontal and vertical. directions. When a finger or another object contacts the touchpad, the circuitry, which may be disposed on the printed circuit board (PCB), may respond to the touch sensor 31 of the touchpad 30 and determine the touched position on the touchpad 30 by sensing a change in capacitance in both X and Y directions, for example.

One end of the top cover 36 may be delineated, for example, into three TrackPoint® button zones, which includes a left button zone 40, a center button zone 42, and a right button zone 44. The other end of the top cover 36 may be delineated, for example, into two touchpad button zones, which include a left touchpad button zone 46, and a right touchpad button zone 48.

Still in the FIGURE, the button zones may represent regions of the touchpad that may be moved by a user to implement distinct button functions. The dotted lines represent areas of the touchpad 30 that make up an individual button zone. Any number of button zones may be used, such as, two, three, four, five, or six, for example.

The touchpad 30 may have a touch sensitive surface. The touch sensitive surface may have at least one part, such as a button zone, comprising a topological feature. The topological feature may differ from topological features or textures in other parts, such as other zones of the touch sensitive surface. The term "topological feature", herein used, generally refers to a type of structure or element that is along, near or integral with the surface of any material. At least one of the surfaces is a roughened surface including, for example, topological or morphological features, such as, projections, protrusions, depressions, pits, closed or open cell structures, particles, islands, lands, trenches, fissures, crevices, and like geometries and features, or combinations thereof.

In some embodiments, the topological features in one set or level of topological features may have an average dimension that differs from the average dimensions of the topological features in the other sets or levels. In some embodiments, the touch sensitive surface of the touchpad 30 may include an uninterrupted surface, which may be made of a dielectric material, such as glass, for example. The touch sensitive surface may be responsive to clicking by an object, such as a finger. The touch sensitive surface may comprise a matte area and a glossy area. The matte area may be made by etching process, such as etching by hydro-fluoric acid (HF). In some embodiments, the matte area may cover a majority of the touch sensitive area with only the center button zone 42 covered by glossy glass. The glossy area used among the matte area may give a user an indication of a specific area which is allocated for a functional button.

In operation, users may slide their fingers on the matte area smoothly since the matte texture reduces friction between fingers and glass. When fingers come across the glossy area, users may feel that fingers stick to the glossy glass since the glossy surface adheres to fingers. A user may differentiate or identify where his or her finger is by sensing a difference in surface texture.

The touchpad 30, together with the pointing stick 24 may be useful for a variety of applications. The pointing stick 24, with the left button zone 40, the center button zone 42, and the right button zone 44, may enable cursor control, typically performed by a mouse. For example, the pointing stick 24 may be used for moving a mouse pointer with an index finger. The left button zone 40 may correspond to the left mouse button. The right button zone 44 may correspond to the right mouse button, with the center button zone 42 corresponding to a scroll wheel of the mouse.

Other exemplary applications that may employ a combination of the pointing stick 24 and button zones 40, 42, 44 may include vertical and horizontal scrolling, 3D rotation, document navigation, gaming applications, pressure sensitive input, and multi-degree of freedom input. Another application for use with the touchpad 30 may include computer control other than cursor control. In an exemplary embodiment, the touch pad 30 may be configured to recognize finger-based gesture shortcuts for menu selections. For example, the touchpad 30 may recognize when a user draws an "O" across the top cover 36 invoking an "Open File" command or menu pick.

The touchpad 30 may further include a plurality of movement indicators. The movement indicators may be any combination of switches, such as mechanical switches, or sensors (not shown). Switches are generally configured to provide pulsed or binary data such as activate (on) or deactivate (off). By way of example, an underside portion of the touchpad 30 may be configured to contact or engage (and thus activate) a switch (not shown) when the user presses on touchpad 30. The touchpad 30 may be connected to the notebook PC 10 by the switch, which may be disposed in the bottom case 11. The switch may be disposed in a center under the touchpad 30 in such way that the switch may allow displacement of the touchpad 30 from a flat position to an activate position (to activate a button function) at the first end 32 when a force is applied to the first end 32 of the touch surface. The top cover 36 of the touchpad 30 may have touch sensitive surface.

The sensors, on the other hand, are generally configured to provide continuous or analog data. By way of example, the sensor may be configured to measure the position or the amount of tilt of touchpad 30 relative the bottom case 11 when a user presses on the touchpad 30. Any suitable mechanical, electrical or optical switch or sensor may be used. For example, tactile switches, force sensitive resistors, pressure sensors, proximity sensors and the like may be used.

When a force is pressed to the first end 32 of the touchpad 30, the first end 32 of the touchpad 30 may move downward from a flat position to an activate position. When the touchpad 30 is at the activate position, the switch may be depressed and touch a base plate under the touchpad 30 to generate a button signal.

The click actions may be generally arranged to actuate one or more switches. That is, a particular button zone moving from the flat or neutral position to a depressed position may actuate a switch. The switch may be configured to sense movements of the button zones and touch positions from the touchpad 30 during the clicking action and send an activating signal (such as an "ON" signal, for example) and signals corresponding to the movements to the electronic device. After receiving the activating signal, the electronic device may check the touch position. If the touch position corresponds to a left button zone 40, for example, the electronic device may make an event corresponding to the left button zone click.

As should be appreciated, the button functions generated by pressing on each button zone may include selecting an item on the screen, opening a file or document, executing instructions, starting a program, viewing a menu, and/or the like. The button functions may also include functions that make it easier to navigate through the electronic system, for example, zoom, scroll, open different menus, home the input pointer, perform keyboard related actions such as enter, delete, insert, page up/down, and the like.

When an object, such as a finger, for example, moves away from the top cover 36, a support under the touchpad 30 may bias the touchpad 30 back to the flat position.

It should be understood, of course, that the foregoing relate to exemplary embodiments of the invention and that modifications may be made without departing from the spirit and scope of the invention as set forth in the following claims.

We claim:

1. An input device, comprising:
a touchpad having a touch sensitive surface, wherein the touch sensitive surface has at least one part comprising a topological feature, wherein the topological feature differs from topological features in other parts of the touch sensitive surface, wherein the touch sensitive surface has at least a continuous surface with demarcated parts representing zones;
a switch disposed under the touchpad; and
wherein the topological feature in the at least one part and the topographical features in the other parts of the touch sensitive surface are surface textures on the touch sensitive surface, the surface textures giving a user an indication of locations of the at least one part and the other parts when a user's finger touches the touch sensitive surface,
wherein the surface textures are one of matte surface causing the user's finger to slide easily thereon due to low friction between the matte surface and the user's finger and glossy surface causing the user's finger to stick thereon due to high friction between the glossy surface and the user's finger, and
wherein the at least one part of the touch sensitive surface comprises the glossy surface and the other parts of the touch sensitive surface comprise the matte surface.

2. The input device of claim 1, wherein the zones include a button zone configured to operate the switch when the button zone is activated.

3. The input device of claim 1, wherein the touchpad generates a first control signal when an object on the touch sensitive surface of the touchpad is moved and the touchpad generates a second control signal when the touchpad is at an activate position.

4. The input device of claim 3, wherein the first control signal is a touching signal and the second control signal is a button signal.

5. The input device of claim 2, wherein the zones include a button zone which functions with a pointing stick.

6. The input device of claim 3, wherein the touchpad includes a touch sensor configured to sense an object, the first control signal being based on a position of the object on the touch sensitive surface of the touchpad.

7. An input device, comprising:
a touchpad having a touch sensitive surface, wherein the touchpad is delineated into zones, wherein
the zones include a button zone which comprise a center button zone, a left button zone, and a right button zone;
the touch sensitive surface is made of a dielectric material, wherein the touch sensitive surface is responsive to clicking by a user's finger; and
wherein the center button zone includes glossy surface, and the left and right button zones include matte surface to give a user an indication of locations of the center button zone, the left button zone and the right button zone when the user's finger touches the button zone, and
wherein the matte surface causes the user's finger to slide easily thereon due to low friction between the matte surface and the user's finger and the glossy surface causes the user's finger to stick thereon due to high friction between the glossy surface and the user's finger.

8. The input device of claim 7, wherein the touch sensitive surface is sensitive to a location where the user's finger slides on the touch sensitive surface.

9. The input device of claim 7, wherein the button zone functions with a pointing stick.

10. A computing system, comprising:
a computing device capable of receiving, processing, and outputting data; and
an input device adapted to send data to the computing device in order to perform an action in the computing device, wherein the input device comprises:
a touchpad coupled to the computing device by a switch and configured to generate touching signals, the touchpad being delineated into zones including a button zone comprising a center button zone, a right button zone, and a left button zone;
the touchpad includes an uninterrupted glass surface, wherein the surface has at least one part comprising a topological feature differing from topological features in other parts of the surface; and
wherein the topological features are surface textures on the uninterrupted glass surface, the surface textures giving a user an indication of locations of the center button zone, the left button zone and the right button zone when a user's finger touches the button zone to generate the touching signals,
wherein the surface textures are one of matte surface causing the user's finger to slide easily thereon due to low friction between the matte surface and the user's finger and glossy surface causing the user's finger to stick thereon due to high friction between the glossy surface and the user's finger, and
wherein the center button zone comprises the glossy surface and the left and right button zones comprise the matte surface.

11. The computing system of claim 10 wherein the switch is a mechanical switch configured to be depressed when the touchpad is depressed.

12. The computing system of claim 10, wherein the button zone functions with a pointing stick.

\* \* \* \* \*